United States Patent [19]
Ohta et al.

[11] Patent Number: 5,809,005
[45] Date of Patent: Sep. 15, 1998

[54] METHOD FOR MANUFACTURING A MAGNETO-OPTICAL MEMORY ELEMENT

[75] Inventors: Kenji Ohta, Yao; Yoshikazu Fujii, Nara; Tetuya Inui, Nara; Toshihisa Deguchi, Nara; Shigemi Maeda, Yamatokoriyama, all of Japan

[73] Assignee: Sharp Kabushiki Kaisha, Osaka, Japan

[21] Appl. No.: 447,739

[22] Filed: May 23, 1995

Related U.S. Application Data

[62] Division of Ser. No. 942,094, Sep. 8, 1992, abandoned, which is a continuation of Ser. No. 206,973, Jun. 14, 1988, abandoned, which is a continuation of Ser. No. 783,109, Oct. 2, 1985, abandoned.

[30] Foreign Application Priority Data

Oct. 2, 1984 [JP] Japan .................................. 59-207838

[51] Int. Cl.$^6$ .................................................... G11B 7/24
[52] U.S. Cl. ...................................... 369/275.4; 369/275.1
[58] Field of Search ............................. 369/275.4, 275.3, 369/275.1, 275.2, 13, 288, 280, 277, 278, 281, 279, 276; 360/59; 428/694 ML, 694 MM, 694 EC, 694 RE; 430/220

[56] References Cited

U.S. PATENT DOCUMENTS

| | | | |
|---|---|---|---|
| 4,385,303 | 5/1983 | Akahira et al. ................... | 369/275.4 X |
| 4,390,600 | 6/1983 | Ohta et al. ............................. | 428/621 |
| 4,414,650 | 11/1983 | Ohta et al. ............................. | 365/122 |
| 4,467,383 | 8/1984 | Ohta et al. ............................. | 360/131 |
| 4,489,139 | 12/1984 | Ohta et al. ............................. | 428/621 |
| 4,544,443 | 10/1985 | Ohta et al. ............................. | 216/24 |
| 4,556,291 | 12/1985 | Chen ..................................... | 359/282 |
| 4,586,092 | 4/1986 | Martens et al. ........................ | 360/59 |
| 4,586,173 | 4/1986 | Ando .................................... | 369/275.4 |
| 4,587,648 | 5/1986 | Ando .................................... | 369/275.4 |
| 4,599,714 | 7/1986 | Endo ..................................... | 369/13 |
| 4,610,912 | 9/1986 | Takahashi et al. .................... | 428/213 |
| 4,634,617 | 1/1987 | Ohta et al. ............................. | 428/65.2 |
| 4,672,593 | 6/1987 | Ojima et al. .......................... | 369/13 |
| 4,821,251 | 4/1989 | Hosoya ................................. | 369/54 X |
| 4,985,881 | 1/1991 | Saito et al. ............................ | 369/13 |
| 5,341,362 | 8/1994 | Fujii et al. ............................. | 369/275.4 |
| 5,517,486 | 5/1996 | Haneda ................................. | 369/280 |

FOREIGN PATENT DOCUMENTS

| | | |
|---|---|---|
| 0099085 | 7/1983 | European Pat. Off. . |
| 0100995 | 8/1983 | European Pat. Off. . |
| 0100995 | 2/1984 | European Pat. Off. . |
| 0126594 | 5/1984 | European Pat. Off. . |
| 0155000 | 3/1985 | European Pat. Off. . |
| 0173533 | 3/1986 | European Pat. Off. . |
| 58-102347 | 6/1983 | Japan . |
| 8403988 | 3/1984 | Japan . |
| 59-77648 | 5/1984 | Japan . |
| 2087628 | 5/1982 | United Kingdom . |
| 2094540 | 9/1982 | United Kingdom . |

*Primary Examiner*—Ali Neyzari

[57] ABSTRACT

A method is provided for manufacturing a magneto-optical memory element having guide grooves for storing information. The method includes applying a laser beam onto a resist film material located on a substrate to produce guide track grooves and address signal pits. Thereafter the resist film is developed. The remaining resist film is removed and a magnetic medium layer is deposited on the substrate.

18 Claims, 6 Drawing Sheets

5,809,005

METHOD FOR MANUFACTURING A MAGNETO-OPTICAL MEMORY ELEMENT

This application is a divisional of application Ser. No. 07/942,094, filed on Sep. 8, 1992, now abandoned, which is a Rule 62 Continuation of Ser. No. 07/206,973, filed on Jun. 14, 1988, now abandoned, which is a Rule 62 Continuation of Ser. No. 06/783,109, filed on Oct. 2, 1985, now abandoned, the entire contents of which are hereby incorporated by reference.

BACKGROUND OF THE INVENTION

1. Field of the Invention

The present invention relates to an optical memory element which optically performs at least one operation which is information recording, reading and erasing.

2. Description of the Prior Art

Recently, an optical memory element, which optically records, reads and erases information, has been drawing attention in various aspects as a high density, large capacity memory. Many studies have been made, particularly for an optical disc memory with disc shaped recording element which permits faster access than a memory with a tape element.

Since the information recording unit of the optical memory element is about 1 $\mu m\phi$, it is essential to place a light beam at a predetermined position for the information reading or erasing operation. Various servo technologies have been employed for this purpose, because it is difficult to control the beam position depending only on mechanical accuracy.

For example, in an optical disc memory, a focus servo is used against the facial movement of the disc, and a tracking servo against the core movement. When the latter servo is used in a read-only type optical memory, beam position is controlled with reference to the previously recorded pits (normally, recesses formed in the PMMA or polycarbonate substrate). In the optical memory of an additive recording type (so called add-on-memory) or of the erasable memory type, however, guide track grooves and address signal pits indicating the positions of the grooves are normally formed in the substrate.

The construction of the conventional guide track grooves used in the optical memory of the add-on-memory type is described now with reference to FIG. 1.

FIG. 1 is a partially enlarged view of a conventional optical memory disc in section along the concentric or circulate guide track grooves formed in the disc.

In FIG. 1, 1 denotes a PMMA or glass substrate 1~1.5 mm thick, and 2 is a photosensitive resin layer (10 $\mu m$ ~100 $\mu m$ thick 2P layer) with guide grooves 3 formed therein for storing information. 4 denotes address signal pits representing the positions of the guide track grooves 3. The depth of the pits 4 is normally $\lambda/4n$ ($\lambda$ is the wave length of the reproducing laser beam, and n is the reflactive index of the 2P layer), so that address signals are optimally reproduced. The depth of the guide grooves 3 is $\lambda/8n$ to permit storage of as many as possible tracking signals.

In addition to the above 2P method, it is also general to form the guide grooves 3 and the pits 4 integral with the PMMA or polycarbonate resin recording disc. In either method, however, moisture in the resin layer, on which a recording medium is disposed, can reach and deteriorate the recording medium.

To overcome the above problem, the inventor has presented a method for forming grooves directly in a glass substrate.

An example is described in copending U.S. patent application Ser. No. 06/606,534, now U.S. Pat. No. 4,544,443, "METHOD FOR MANUFACTURING AN OPTICAL MEMORY ELEMENT", filed on May 3, 1984 now U.S. Pat. No. 4,544,443, issued Oct. 1, 1985, by Kenji OHTA, Junji HIROKANE, Hiroyuki KATAYAMA, Akira TAKAHASHI and Hideyoshi YAMAOKA, and assigned to the same assignee as the present application. The corresponding European Patent Application was filed on May 10, 1984 and assigned the Application No. 84303176.6. The corresponding Canadian Patent Application was filed on May 8, 1984 and assigned the Application No. 453,843.

According to the invention in the copending application, a resist film is disposed on a glass substrate, and a laser beam is applied onto the resist film to form a guide groove and address signal pit pattern in the resist film. The thus formed pattern is developed and, then, the developed resist film is directly disposed on the glass substrate by the reactive ion etching operation. With this method, however, it is difficult to form the guide grooves 3 and the address signal pits 4 of different depths, because their depth is determined by the amount of time to which the glass substrate is exposed to plasma in the reactive ion etching operation. Accordingly, the configurations of the guide grooves and the address signal pits must be determined, taking into consideration the address signal output, tracking output or signal output for reading these outputs.

OBJECTS AND SUMMARY OF THE INVENTION

Objects of the Invention

Accordingly, an object of the present invention is to provide a novel optical memory element which is stable in operation.

Another object of the present invention is to provide an optical memory element having guide grooves and address signal pits of configurations which allow sufficient capacity for tracking signals, address signals and information reading signals.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, the optical memory element of the present invention includes guide grooves and address signal pits narrower than the guide grooves and representing the addresses of the guide grooves.

BRIEF DESCRIPTION OF THE DRAWINGS

The present invention will be better understood from the detailed description give hereinbelow and the accompanying drawings which are given by way of illustration only, and thus are not limitative of the present invention and wherein.

DESCRIPTION OF THE PREFERRED EMBODIMENTS

Figure 1:
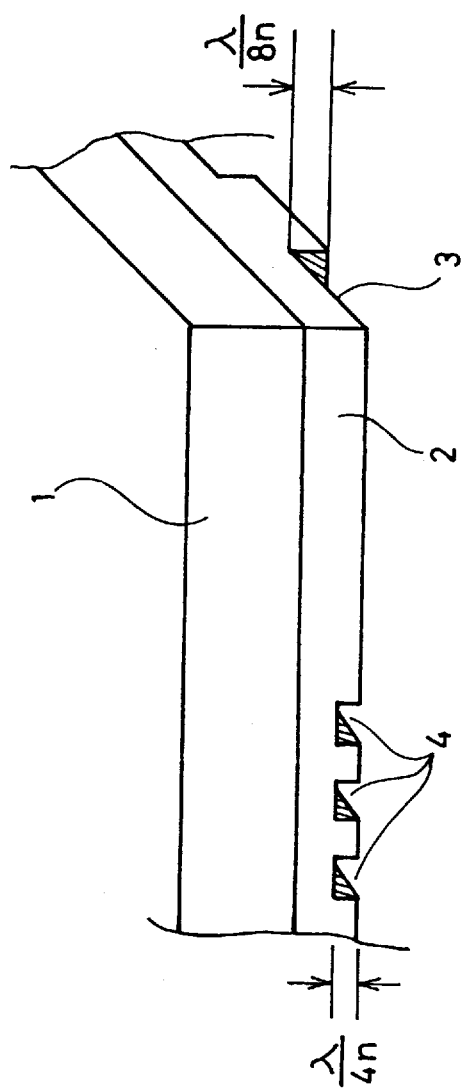
FIG. 1 is a perspective view which schematically shows a sectional structure of an optical memory disc of the prior art.
Figures 2, 3:
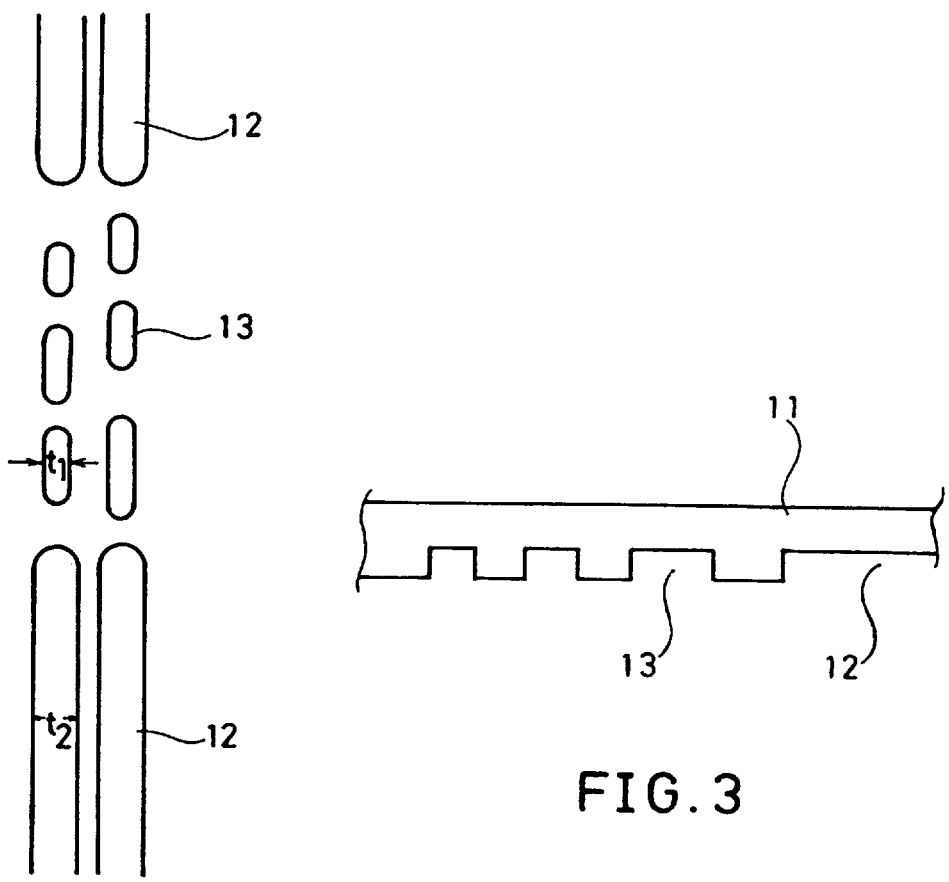
FIG. 2 is an enlarged view showing guide grooves and address signal pits representing the addresses of the guide grooves in the optical memory element of the present invention.
FIG. 3 is a partially enlarged view of the optical memory element disc in section along the guide grooves.

FIG. 2 is an enlarged view of guide grooves and address signal pits representing the addresses of the guide grooves in the optical element of the invention, and FIG. 3 is a partially enlarged view of the optical memory element disc in section, along the guide groove.

In the figures, 11 is a substrate made of, for example, of glass. Elements 12 are guide grooves formed in the substrate 11. Element 13 is address signal pits representing the numbers of the guide grooves 12. As shown in FIG. 2, the pit width $t_1$ the pits 13 is formed narrower than the groove width $t_2$ of the guide grooves 12.

Figure 4:
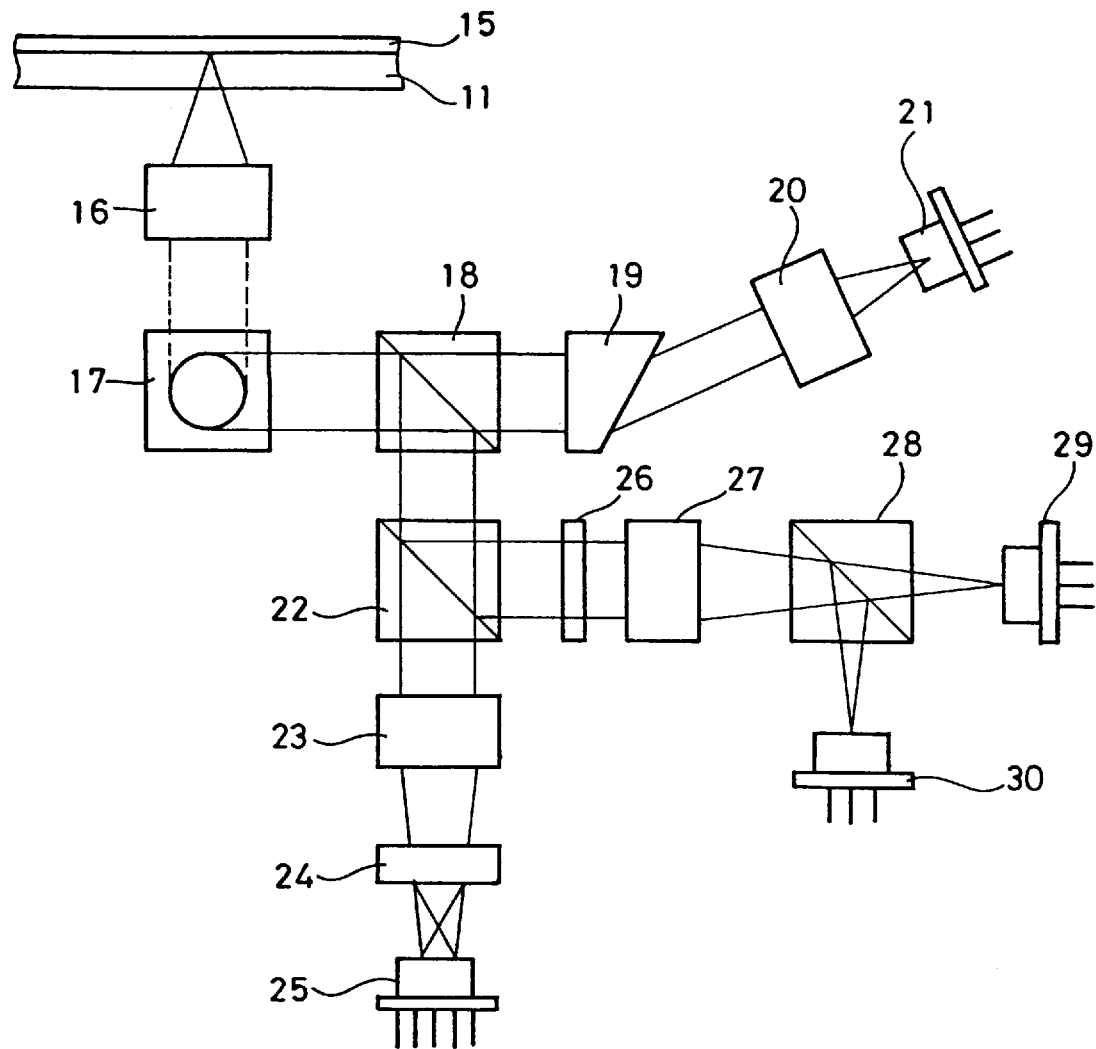
FIG. 4 is a conceptual drawing showing the construction of the pick-up for an optical magnetic disc.

FIG. 4 is a conceptual drawing of the construction of the optical system for an optical magnetic disc capable of rewriting the stored information. Elements 11 is a glass substrate, 15 is an optical magnetic recording medium, 16 is an objective lens, 17 is a reflection lens, 18 is a beam splitter, 19 is a beam shape controlling prism, 20 is a collimator lens, 21 is a semiconductor laser, 22 is a beam splitter, 23 is a lens, 24 is a cylindrical lens, 25 is a quarterly PIN photo diode, 26 is a $\lambda/2$ filter plate, 27 is a lens, 28 is a deflecting beam splitter, and 29 and 30 are avalanche photo diodes.

In FIG. 4, a tracking signal is obtained from the quarterly PIN photo diode 25 by the push-pull method, and an address signal is obtained by summing the outputs from the two avalanche photo diodes 29 and 30. An information signal is obtained by the differential detection method, that is, by subtraction between the outputs from the avalanche photo diodes 29 and 30. N.A. of the objective lens 16 is 0.6, and the beam is stopped down to about 1.1 μm at the position of $1/e^2$.

Figure 5:
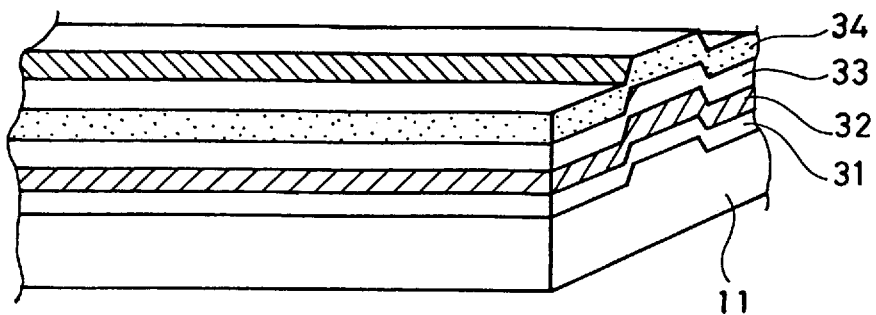
FIG. 5 is a partially enlarged section view of the optical magnetic disc.

FIG. 5 is a partially enlarged view of the optical magnetic disc, in section across the guide track grooves 12, from which disc information is reproduced by the optical system shown in FIG. 4. An AlN layer 31, GbTbFe 32, AlN layer 33 and AlNi layer 34 are formed in lamination on the glass substrate 11 with guide grooves formed therein.

Figure 6:
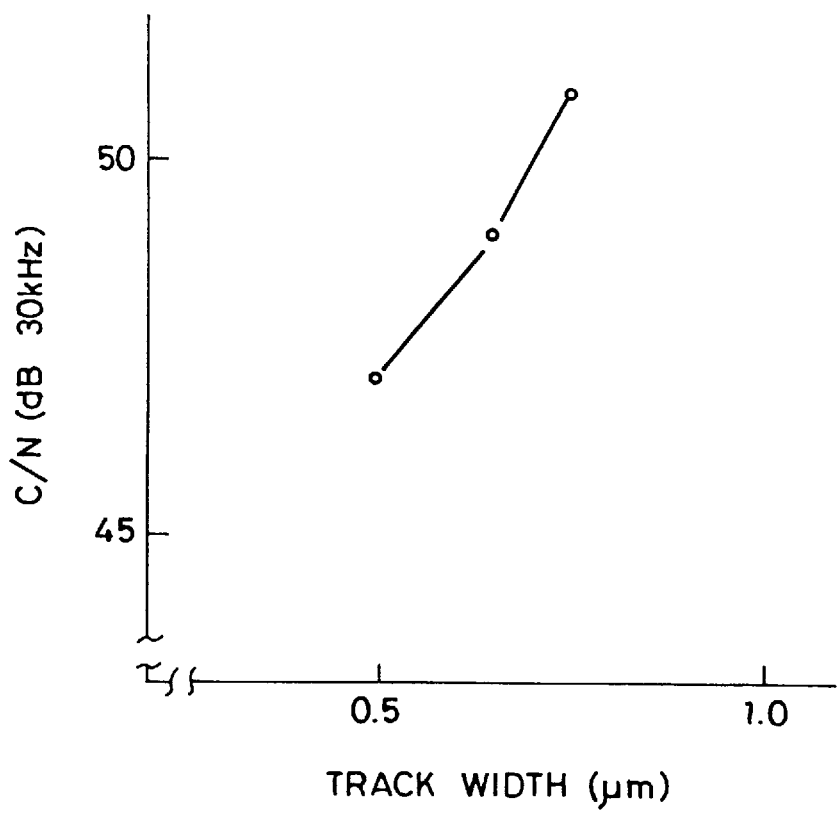
FIG. 6 shows the relationship between C/N and the track width.

FIG. 6 illustrates C/N plotted as a function of the track width $t_2$, with 1 MHz signal being recorded on or reproduced from the optical magnetic disc (shown in FIG. 5) whose guide groove (track) depth is 700 Å.

Figure 7:
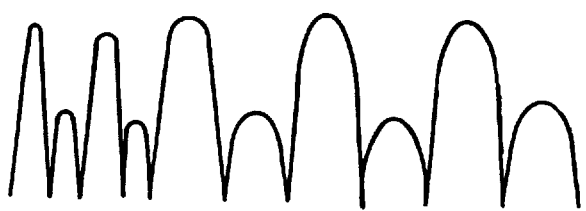
FIGS. 7 (A) and 7 (B) show the variation of the address signal according to the track width.
Figure 7:
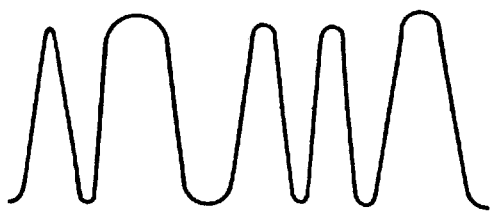

FIG. 7 (A) illustrates the waveform of reproducing address signal of the optical magnetic disc used for the measurement in FIG. 6, for the track width of 0.75 μm, FIG. 7 (B) shows the corresponding waveform for the track width of 0.48 μm.

Figure 8:
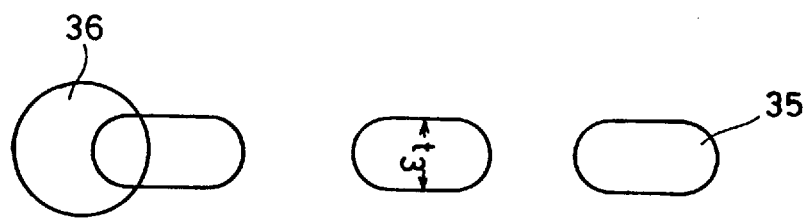
FIGS. 8 (A) and 8 (B) show the relationship between the recording signal or address signal pits and the beam diameter.
Figure 8:
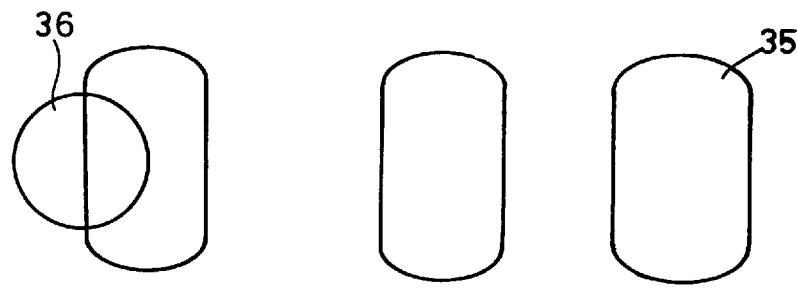

As clearly shown in FIG. 6, wider track width results in an information signal of better C/N. This is easily understood from the following two facts: First, C/N quality depends upon the relationship between the beam diameter 36 and the width $t_3$ of the signal pits 35 as shown in FIG. 8 (A); ideally, the signal pits 35 should be wider than the beam diameter 36 as shown in FIG. 8 (B). Second, the pit width in the optical magnetic disc having the guide grooves therein is limited by the width $t_2$ of the guide grooves 12.

Further, it also be appreciated from FIGS. 7 (A) and 7 (B) that narrower address signal pit width $t_1$ effects better result. When a wider pit width $t_1$ is selected, namely, when the signal pits 35 in FIG. 8 (B) are considered as address signal pits, for instance, the beam 36, which comes in the center of a pit 35, completely enter the pit 35, resulting in the condition as if there was no pit. As a result, amount of light returning to the detector will increase. This is why the signal is high at the center, as shown in FIG. 7 (A).

It will be well understood from the above description that, in the optical magnetic recording disc having about $\lambda/8n$ (650~700 Å) deep guide track grooves 12 and address signal pits 13, the larger width $t_2$ of the guide track grooves 12 and the narrower width $t_1$ of the address signal pits 13, as shown in FIG. 2, yield the better result.

For the optical memory element with the above mentioned construction in which an optical head shown in FIG. 4 is used with a disc shown in FIGS. 2, 3 and 5, sufficient tracking signal is obtained with 1 μm or narrower track width $t_2$.

As described above, one of the features of the optical memory element of the present invention is that, where address signal pits are as deep as a guide track groove as shown in FIG. 2, the width of the address signal pits is made narrower and that of the guide track groove made wider.

Now, the manufacturing steps for a glass disc used in the present invention will be described in the following.

Step (i)

A resist film 37 is applied on a glass substrate 11 which does not pass oxygen and moisture therethrough.

Step (ii)

An argon (Ar) laser beam 38 is applied to the resist film 37 disposed on the glass substrate 11, via light modulators 39 and 40, a mirror 41 and a condenser 42, so as to describe lines of the width $t_2$ for the guide track grooves 12 (illustrated in FIG. 2) of the optical memory element as well as intermittent lines of the width $t_1$ (See FIG. 9) for the address signal pits 13. The required widths for the guide track grooves 12 and the address signal pits 13 are obtained by making the laser power larger in describing the lines for the guide track grooves 12 than in describing the intermittent lines for the address signal pits 13.

Figure 9:
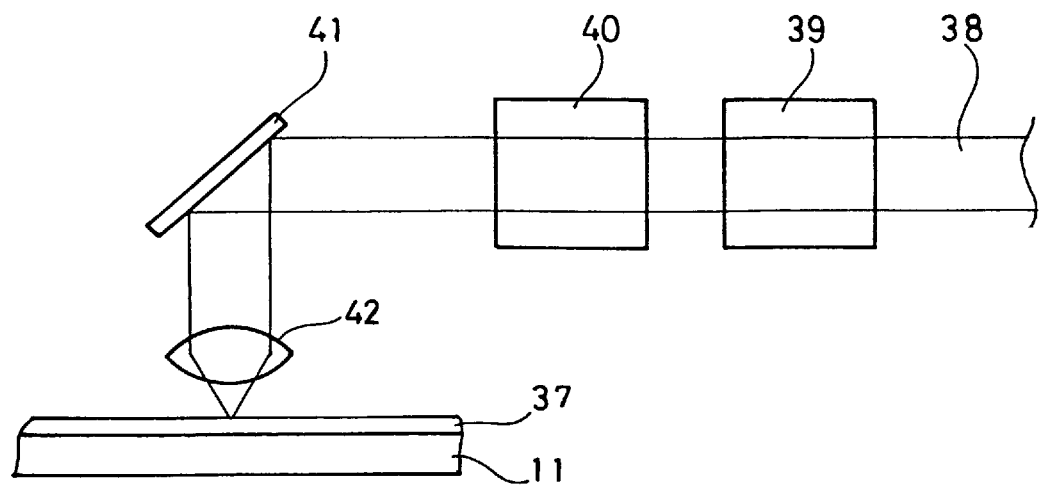
FIG. 9 shows an example method for manufacturing the optical memory element of the present invention.
Figure 10:
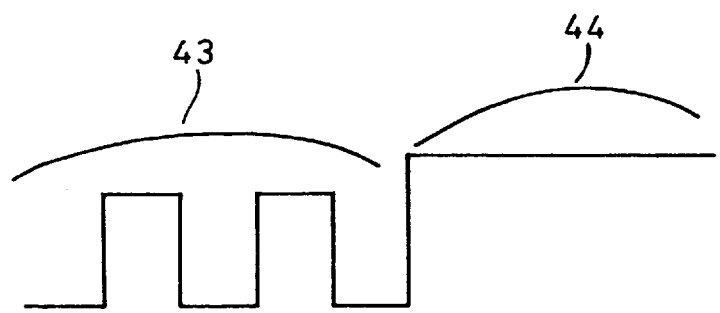
FIG. 10 shows an example of the electrical input signals for manufacturing the optical memory element of the present invention.

Specifically, the light modulators 39 and 40 are placed in the light path of the laser (for example, Ar) beam 38, as illustrated in FIG. 9. One of the light modulators is used for Modulating address signals, the other being used for reducing the laser power a little when describing the lines for the address signal pits. Instead of using the above two modulators, a modulator wherein modulation changes linearly according to the input may be used. In this case, the input power height 43 (FIG. 10) for recording the address signal pits is made lower than the input power height 44 for recording the guide track grooves.

Step (iii)

The resist film 37 with the lines and the intermittent lines thereon is developed to form grooves and pits in the resist film 37.

Step (iv)

Sputtering operation (reactive ion etching) is applied to the glass substrate 11 coated with the resist film 37 having the grooves formed therein, in the etching gas atmosphere such as $CF_4$ or $CHF_3$, so as to form the grooves 12 and the pits 13 in the glass substrate 11.

Step (v)

The developed resist film 37 is removed from the glass substrate 11 by the use of solvent such as acetone, or by a sputtering operation in an $O_2$ atmosphere. As a result, the guide track grooves 12 of the width $t_2$ and the address signal pits 13 of the width $t_1$ are formed in the glass substrate 11.

In this way, the guide track grooves 12 and the address signal pits 13 of the configurations as shown in FIG. 2 are formed in the glass substrate 11.

Having described a specific embodiment of the invention based on the combination of a glass disc and an optical magnetic disc, it is our intention that the invention be not limited by any of the details of description. It will be obvious that the same may be varied in many ways. Such variations are not to be regarded as a departure from the spirit and scope of the invention, and all such modifications are intended to be included within the scope of the following claim.

What is claimed is:

1. A method of making an optical memory element, comprising the steps of:

providing a substrate including a plurality of guide track grooves and at least one address signal pit provided between two successive guide track grooves; and forming a multilayered structure on the substrate, the multilayered structure including a recording layer configured for recording data information with a uniform thickness, which is substantially constant prior to and after the recording of the data information, at least in the guide track grooves wherein a width of the address signal pit is made narrower than a width of each of the guide track grooves.

2. The method according to claim 1, wherein the substrate provided is a glass substrate.

3. The method according to claim 1, wherein the substrate provided is a resin substrate.

4. The method according to claim 1, wherein the address signal pit is configured for providing address signal information through a detection of a variation of a light beam intensity reflected from the address signal pit.

5. The method according to claim 1, wherein the address signal pit is configured for providing address signal information through a detection of a diffraction of a light beam intensity reflected from the address signal pit.

6. The method according to claim 1, wherein the multilayered structure is configured for providing the data information through a detection of a variation of a magnetic polarization angle property.

7. The method according to claim 1, wherein the multilayered structure includes a perpendicular magnetization layer, and is configured for providing the data information through a detection of a difference in a magneto-optical rotation angle corresponding to a direction of magnetization of the perpendicular magnetization layer.

8. The method according to claim 1, wherein the width of each of the guide track grooves is about 1.0 μm or less.

9. The method according to claim 1, wherein the width of each of the guide track grooves is in a range of about 0.75 μm to about 1.0 μm.

10. The method according to claim 1, wherein a depth of the address signal pit is substantially equal to a depth of each of the guide track grooves.

11. The method according to claim 1, wherein a depth of the address signal pit is equal to approximately 700 Å.

12. The method according to claim 1, wherein the multilayered structure includes a magneto-optical recording layer.

13. The method according to claim 12, wherein the magneto-optical recording layer is an alloy layer of a rare earth element and a transition element.

14. The method according to claim 12, wherein the magneto-optical recording layer is a GdTbFe alloy layer.

15. The method according to claim 1, wherein the multilayered structure includes a first AlN layer, a GdTbFe layer, a second AlN layer, and an AlNi layer.

16. The method according to claim 11, wherein the at least one address signal pit is provided between the two successive guide track grooves in a circumferential direction.

17. The method according to claim 1, wherein the at least one address signal pit is aligned with the guide track grooves in a longitudinal direction of the guide track grooves.

18. The method according to claim 1, wherein the multilayered structure includes a first AlN layer, a magneto-optical memory layer, a second AlN layer and an AlNi layer.

* * * * *